United States Patent
Corbin et al.

(10) Patent No.: US 11,842,819 B2
(45) Date of Patent: Dec. 12, 2023

(54) METHOD FOR REPLACING A CESIUM TRAP AND CESIUM TRAP ASSEMBLY THEREOF

(71) Applicant: TerraPower, LLC, Bellevue, WA (US)

(72) Inventors: Robert A. Corbin, North Bend, WA (US); John E. Truax, Seattle, WA (US)

(73) Assignee: TerraPower, LLC, Bellevue, WA (US)

( * ) Notice: Subject to any disclaimer, the term of this patent is extended or adjusted under 35 U.S.C. 154(b) by 30 days.

(21) Appl. No.: 17/479,116

(22) Filed: Sep. 20, 2021

(65) Prior Publication Data

US 2022/0005621 A1 Jan. 6, 2022

Related U.S. Application Data

(63) Continuation of application No. 16/498,665, filed as application No. PCT/US2018/025216 on Mar. 29, 2018, now Pat. No. 11,152,127.

(60) Provisional application No. 62/478,419, filed on Mar. 29, 2017.

(51) Int. Cl.
   *G21C 19/313* (2006.01)
   *G21C 17/022* (2006.01)

(52) U.S. Cl.
   CPC ......... *G21C 19/313* (2013.01); *G21C 17/022* (2013.01)

(58) Field of Classification Search
   CPC ...... G21C 19/31; G21C 19/32; G21C 19/303; G21C 19/313
   See application file for complete search history.

(56) References Cited

U.S. PATENT DOCUMENTS

| | | | | |
|---|---|---|---|---|
| 2,745,552 A | * | 5/1956 | Bruggeman | B01D 29/11 165/136 |
| 3,618,770 A | * | 11/1971 | Pohl | G21C 19/313 210/85 |
| 3,853,504 A | | 12/1974 | Buscher et al. | |
| 3,993,453 A | | 11/1976 | Ross et al. | |
| 4,010,068 A | * | 3/1977 | Cooper | G21C 19/313 976/DIG. 269 |
| 4,040,903 A | | 8/1977 | Monroe | |
| 4,047,040 A | | 9/1977 | Houston | |
| 4,047,101 A | | 9/1977 | Bauerle et al. | |
| 4,095,171 A | | 6/1978 | Bauerle et al. | |

(Continued)

FOREIGN PATENT DOCUMENTS

| | | |
|---|---|---|
| CN | 101168128 | 4/2008 |
| CN | 107402251 | 5/2022 |

(Continued)

OTHER PUBLICATIONS

Wahlquist, D. R. Equipment design guidelines for remote hot cell operations. No. ANL/ED/CP-95878. Argonne National Lab., IL (US), 1998. (Year: 1998).*

(Continued)

*Primary Examiner* — Lily C Garner
(74) *Attorney, Agent, or Firm* — Merchant & Gould P.C.

(57) ABSTRACT

A method for replacing a cesium trap includes freezing the cesium trap which partially contains cesium and is located within a shielded cell and. The cesium trap is then decoupled and removed from the shielded cell. A second cesium trap is inserted into the shielded cell and attached to the shielded cell.

9 Claims, 5 Drawing Sheets

(56) References Cited

U.S. PATENT DOCUMENTS

| | | | |
|---|---|---|---|
| 4,117,396 A | 9/1978 | Berkey et al. | |
| 4,119,488 A | 10/1978 | Barosi | |
| 4,121,458 A | 10/1978 | Fort | |
| 4,131,511 A | 12/1978 | Mordarski | |
| 4,195,891 A | 4/1980 | Hellier | |
| 4,257,847 A | 3/1981 | Gibby et al. | |
| 4,325,029 A | 4/1982 | Hrizo et al. | |
| 4,366,438 A | 12/1982 | Ibe et al. | |
| 4,578,242 A | 3/1986 | Sharma | |
| 4,587,083 A * | 5/1986 | Colburn | G21C 19/31 210/791 |
| 4,710,343 A | 12/1987 | Christiansen et al. | |
| 4,719,355 A | 1/1988 | Meyers et al. | |
| 4,737,281 A * | 4/1988 | Desir | B01D 35/18 376/312 |
| 4,782,235 A | 11/1988 | Lejeune et al. | |
| 4,845,364 A | 7/1989 | Alexander et al. | |
| 4,853,177 A | 8/1989 | Pettus | |
| 4,892,653 A * | 1/1990 | Latge | C22B 26/10 210/489 |
| 4,928,497 A * | 5/1990 | Latge | G21C 19/313 210/186 |
| 4,984,952 A | 1/1991 | Reuter | |
| 5,030,411 A * | 7/1991 | Cooper | G21C 19/313 376/315 |
| 5,820,681 A | 10/1998 | Colombo et al. | |
| 6,030,458 A | 2/2000 | Colombo | |
| 6,117,208 A | 9/2000 | Sharma | |
| 6,316,773 B1 | 11/2001 | Giakos | |
| 6,602,919 B1 | 8/2003 | Collins | |
| 6,840,085 B1 | 1/2005 | Kolaja et al. | |
| 7,794,630 B2 | 9/2010 | Cattaneo et al. | |
| 7,842,194 B2 | 11/2010 | Giannantonio et al. | |
| 8,123,862 B2 | 2/2012 | Ohara | |
| 8,308,866 B2 | 11/2012 | Negishi | |
| 8,421,470 B2 | 4/2013 | Kitano et al. | |
| 8,502,158 B1 | 8/2013 | Gordeev et al. | |
| 9,178,103 B2 | 11/2015 | Wu et al. | |
| 9,341,596 B1 | 5/2016 | Chen et al. | |
| 9,921,184 B2 | 3/2018 | Corbin et al. | |
| 10,636,532 B2 | 4/2020 | Anderson et al. | |
| 10,685,750 B2 | 6/2020 | Eichel et al. | |
| 11,257,600 B2 * | 2/2022 | Anderson | G21C 19/31 |
| 2003/0127053 A1 | 7/2003 | Kim | |
| 2003/0201586 A1 | 10/2003 | Kim | |
| 2009/0277390 A1 | 11/2009 | Soininen | |
| 2013/0010915 A1 | 1/2013 | Garnier et al. | |
| 2014/0007814 A1 | 1/2014 | Villette et al. | |
| 2015/0314240 A1 | 11/2015 | Loewen et al. | |
| 2016/0208374 A1 | 7/2016 | Lattimer | |
| 2016/0320334 A1 | 11/2016 | Nakatou et al. | |
| 2017/0337995 A1 | 11/2017 | Anderson et al. | |
| 2020/0105428 A1 * | 4/2020 | Corbin | G21C 17/022 |
| 2020/0258644 A1 | 8/2020 | Anderson et al. | |

FOREIGN PATENT DOCUMENTS

| | | | |
|---|---|---|---|
| EP | 05087151 | 9/1992 | |
| EP | 0508715 | 10/1992 | |
| GB | 1141083 | 1/1969 | |
| GB | 1368452 | 9/1974 | |
| GB | 2005900 | 4/1979 | |
| GB | 2031216 | 4/1980 | |
| GB | 2113901 A * | 8/1983 | C01B 21/063 |
| GB | 2183893 | 6/1987 | |
| JP | 5015204 | 6/1975 | |
| JP | 51107212 | 9/1976 | |
| JP | 51140875 | 12/1976 | |
| JP | 5551396 | 4/1980 | |
| JP | 6043447 | 3/1985 | |
| JP | 61228382 | 10/1986 | |
| JP | 01123198 | 5/1989 | |
| JP | 02183199 | 7/1990 | |
| JP | 1992286996 | 10/1991 | |
| JP | 0469592 | 3/1992 | |
| JP | 04122897 | 4/1992 | |
| JP | 1992122897 | 4/1992 | |
| JP | 04286996 | 10/1992 | |
| JP | 05100065 | 4/1993 | |
| JP | 04206243 | 12/1999 | |
| JP | 09243530 | 4/2000 | |
| JP | 2012032250 | 2/2012 | |
| JP | 2008231194 | 12/2013 | |
| JP | 2014089102 | 12/2016 | |
| RU | 693868 | 8/1984 | |
| RU | 2328783 | 7/2008 | |

OTHER PUBLICATIONS

Barton, Prototype Applications Loop (PAL) and Sodium Characterization System (SCS) Investigations, Hanford Engineering Development Laboratory, Nov. 1973, 39 pages.

Bechtold, R.A., et al., FFTF Cesium Trap Design, Installation, and Operating Experience, Fourth International Conference on Liquid Metal Technology, Avignon, France, Oct. 18, 1988. Date Published Jun. 1988, 12 pages.

Breitwieser et al., Saha-Langmuir Surface Ionization Relation, thermionic Conversion Specialist Conference sponsored by the Institute of Electrical and electronics Engineers, San Diego, CA Oct. 25-27, 1965, 13 pages.

Cesium Getter Development—Poster, TerraPower, LLC.

Chandran et al., Performance Testing of in-sodium sensors and simulated experiments in, sodium chemistry loop; Nuclear Engineering Design 268 (2014) 1-9.

Dunn et al., Calculation of Electrical and Thermal Conductivities of Metallurgical Plasmas, Bulletin (Welding Research council (U.S.)), 357, 21 pages, 1990.

Hrizo et al., Sodium Ionization Detector and Sensor, Final Technical Report, Westinghouse Research and Development Center, Contract EN-77-C-02-4197.A000 Department of Energy, May 8, 1979, 51 pages.

International Atomic Energy Agency Radioactive Sodium Waste Treatment and Conditioning, IAEA, Vienna, 2007, IAEA-TECDOC-1524, ISBN 92-0-116006-2, ISSN 1011-4289, 68 pages.

Lamgmuir et al., Thermionic Effects Caused by Vapours of Alkali Metals, Proc. of the Royal Society a Mathematical Physical & Engineering Sciences, 107, doi: 10.1098/rspa. 1025.0005, published Jan. 1, 1925, 20 pages.

Lau, J., Electrical Conductivity of Inert Gases-Seed Combination in Shock Tubes, Defense Documentation Center for Scientific and technical Information, DDC No. 445232, Aug. 1964, 21 pages.

Morris et al., An Evaluation of Liquid Metal Leak Detection Methods for the Clinch River Breeder Reactor Plant, Prepared for the US Nuclear Regulatory Commission under Related Services Contract 8D08 to the Prime Contract CY-76-C-06-1830 with the Department of Energy, Dec. 1977, 121 pages.

Mozgovoy et al., New Equations of state and the Tables of Cesium Vapor Thermodynamic Properties at Temperatures <1700K and Pressure <5.5 Mpa, Chemistry and Computational Simulation. Butlerov Communications. vol. 3. No. 10, pp. 36-38, 2001.

PCT/US2017/021125 IPRP—International Preliminary Report on Patentability dated Sep. 20, 2018, 9 pages.

PCT/US2017/021125 ISR + WO—International Search Report and Written Opinion.

PCT/US2017/033578 IPRP—International Preliminary Report on Patentability for PCT/U2017/033578.

PCT/US2017/033578 ISR + WO—International Search Report and Written Opinion for PCT/US17/33578.

PCT/US2018/025216 IPRP—International Preliminary Report on Patentability in International Application PCT/US2018/025216, dated Oct. 10, 2019, 8 pages.

PCT/US2018/025216 ISR + WO—International Search Report and Written Opinion of the International Searching Authority for International Patent Application No. PCT/US2018/025216 dated Sep. 18, 2018, 14 pages.

PCT/US2020/042905 ISR and WO—International Search Report and Written Opinion.

(56) References Cited

OTHER PUBLICATIONS

RDT Standard, Vapor Trap Assemblies for Sodium Service, Apr. 1972, 66 pages.
Romanenko et al., Immobilization of Cesium Traps from the BN-350 Fast Reactor, WM2011 Conference, Feb 27-Mar. 3, 2011, Phoenix, AZ., pp. 1-15.
Romanenko, O.G., et al., Cleaning Cesium Radionuclides from BN-350 Primary Sodium, Nuclear Technology, Published online: Apr. 10, 2017, 22 pages.
Sobolev, A. et al., "Purification of the Coolant of Fast Reactors from Cesium", Atomic Energy, 72(3): 220-224 (1992).
Sodium Cesium Ion Detector Lab Poster 2015.
Studart et al., Processing Routes to Macroporous Ceramics: A Review, J. Am. Ceram. Soc. 89[6], pp. 1771-1789, 2006.
Swaminathan et al., ). Development of a sodium ionization detector for sodium-to-gas leaks. United Kingdom: British Nuclear Energy Society, 1984.
Sylvia et al., Development of Sodium Leak Detectors for PFBR, Nuclear Engineering and Design 249 (2012) 419-431.
Vaidyanathan et al., Sensors in Sodium Cooled Fast Breeder Reactors, National Journal of Electronic Sciences & Systems, vol. 3 No. 2, Oct. 2012, 10 pages.
Wahlquist, D.R., et al., Equipment Design Guidelines for Remote Hot Cell Operations, Argonne National Laboratory—West, American Glovebox Society 11th Annual Conference Orlando, Florida Jul. 12-15, 1998, 11 pages.
Wolson, et al., Development of on-line Monitoring Device to Detect the Presence/Absence of Sodium Vapor, ANL-83-21, Mar. 1983, 18 pages.
Yamamoto et al., Development of Fluctuation Monitor Type Sodium Ionization Detector, Journal of Nuclear Science and Technology, 23:7, 573-581, 1986.
Yamamoto et al., Using Anemometer for Particle Size Measurement of Sodium Mist, Journal of Nuclear Science and Technology, 16:8, 616-618, 1979.

\* cited by examiner

METHOD FOR REPLACING A CESIUM TRAP AND CESIUM TRAP ASSEMBLY THEREOF

This application is a continuation of U.S. patent application Ser. No. 16/498,665, now U.S. Pat. No. 11,152,127, filed Sep. 27, 2019, which application is a National Stage Application of PCT/US2018/025216, filed Mar. 29, 2018, which claims the benefit of priority to U.S. Provisional patent application Ser. No. 62/478,419, filed Mar. 29, 2017, the entire disclosures of which are incorporated by reference in their entireties. To the extent appropriate, a claim of priority is made to each of the above disclosed applications.

INTRODUCTION

Nuclear fission reactors include breed-and-burn fast reactors (also referred to as traveling wave reactors, or TWRs). TWR means a reactor that would be designed to operate indefinitely using natural uranium, depleted uranium, spent light water reactor fuel, or thorium as a reload fuel after start up, and in which waves that breed and then burn would travel relative to the fuel. Thus, in some aspects, the TWR is a once-through fast reactor that runs on subcritical reload fuel which is bred up to a useful state and burned in situ. In a TWR, a wave of breeding and fissioning (a "breed-burn wave") is originated in the core of the reactor and moves relative to the fuel. In cases where the fuel is stationary, the breed and burn wave expands outward from the ignition point. In some cases, the fuel is moved so that the breed and burn wave stays stationary relative to the core (e.g., a standing wave) but moves relative to the fuel; a standing wave is considered a type of TWR. Movement of fuel assemblies is referred to as "fuel shuffling" and is used to maintain the standing wave and for adjustment of reactor characteristics (heat, flux, power, fuel burn up, etc.). Nuclear fissioning occurs in the core in which the fuel assemblies are shuffled is housed in a reactor vessel. The fuel assemblies include fissile nuclear fuel assemblies and fertile nuclear fuel assemblies. Reactivity control is primarily accomplished by control rod assemblies also located in the core for adjustment of reactor characteristics.

Fission energy developed by the standing wave creates thermal energy which is transferred in series through one or more heat transport loops to steam generators to produce electricity, and low temperature heat is rejected through a set of water-cooled vacuum condensers. The separation of coolant systems into both primary and intermediate coolant loops helps maintain the integrity of the core and the primary coolant loops. In the TWR, both the primary coolant and intermediate coolant loop utilizes liquid sodium.

SUMMARY

In one aspect, the technology relates to a method of replacing a cesium trap, the method includes: freezing a first cesium trap at least partially containing cesium therein, wherein the first cesium trap is located within a shielded cell; decoupling the first cesium trap from the shielded cell; removing the first cesium trap from the shielded cell; inserting a second cesium trap into the shielded cell; and attaching the second cesium trap to the shielded cell. In an example, the first cesium trap includes at least one of: remotely decoupling at least one lateral support anchor extending between the first cesium trap and the shielded cell; remotely decoupling the first cesium trap from a sodium processing circuit; and remotely disconnecting electrical power and instrument control attachments extending between the first cesium trap and the shielded cell. In another example, remotely decoupling the at least one lateral support anchor includes removing a connection member that couples a cell anchor extending from the shielded cell to a trap anchor extending from the first cesium trap. In yet another example, the connection member is at least one of a pin and a bolt. In still another example, remotely decoupling the first cesium trap from a sodium processing circuit includes: crimping at least one sodium line extending from the first cesium trap; and cutting the at least one sodium line adjacent the crimped portion such that a first portion of the at least one sodium line extends from a top portion of the first cesium trap and a second portion of the at least one sodium line remains part of the sodium processing circuit.

In another example of the above aspect, remotely disconnecting electrical power and instrument control attachments includes unplugging at least one of an electrical power attachment and an instrument control attachment from a corresponding receiver disposed on a top portion of the first cesium trap. In an example, the first cesium trap includes: releasably coupling the first cesium trap to a lifting tool; and lifting, via the lifting tool, the first cesium trap out of the shielded cell such that a base of the first cesium trap slidably disengages with at least one locating pin extending from a bottom of the shielded cell. In another example, the method includes decoupling a cooling line inlet extending from the first cesium trap from a fixed cooling line extending from the shielded cell via the lifting operation. In yet another example, releasably coupling the first cesium trap to a lifting tool includes rotating and lifting at least one hook of the lifting tool into a corresponding lifting eye disposed on the first cesium trap. In still another example, inserting the second cesium trap includes: releasably coupling the second cesium trap to a lifting tool, wherein the lifting tool includes at least one hook and the second cesium trap includes at least one corresponding lifting eye; placing, via the lifting tool, the second cesium trap into the shielded cell; and simultaneously aligning a base of the second cesium trap with at least one locating pin extending from a bottom of the shielded cell.

In another example of the above aspect, the method includes coupling, via a slidable engagement, a cooling line inlet extending from the second cesium trap to a fixed cooling line extending from the shielded cell. In an example, attaching the second cesium trap includes at least one of: coupling a cell anchor extending from the shielded cell to a trap anchor extending from the second cesium trap forming at least one lateral support anchor extending between the first cesium trap and the shielded cell; welding at least one first sodium line extending from the second cesium trap to at least one second sodium line extending from a sodium processing circuit; and connecting electrical power and instrument control attachments via plugging the attachments into a corresponding receiver disposed on a top portion of the second cesium trap. In another example, the first cesium trap contains a predetermined amount of cesium and the second cesium trap contains no amount of cesium. In yet another example, the shielded cell is an individualized shielded cell.

In another aspect, the technology relates to a cesium trap having: a body having a top portion, the body enclosing a filter and an active material configured to remove cesium from a sodium stream; a cooling jacket disposed substantially around the body; and at least one first sodium line extending from the top portion, wherein the at least one first sodium line is configured to couple in flow communication with a corresponding at least one second sodium line of a sodium processing circuit. In an example, the cesium trap further includes at least one trap anchor extending from the cooling jacket, wherein the trap anchor is releasably couplable to at least one corresponding cell anchor extending from the shielded cell so as to form at least one lateral support anchor. In another example, the cesium trap includes at least one lifting eye disposed on the top portion, the at least one lifting eye configured to receive a lifting tool for placing the cesium trap into and removing the cesium trap from a shielded cell. In still another example, the cesium trap an inlet cooling line extending from a bottom portion of the cooling jacket, wherein the inlet cooling line has a free end that is releasably couplable in flow communication to a corresponding fixed cooling line within the shielded cell. In still another example, the cesium trap includes at least one receiver disposed on the top portion, wherein electrical power and instrument control attachments are configured to releasably plug into the at least one receiver. In another example, the cesium trap includes a base coupled to a bottom portion of the body, wherein at least one opening is defined within the base such that the base is positionable within a bottom of the shielded cell via at least one corresponding locating pin.

In another aspect, the technology relates to a cesium trap having: a body having a top portion, the body enclosing a filter and an active material configured to remove cesium from a sodium stream containing cesium and argon; and at least one first sodium line extending from the top portion, wherein the at least one first sodium line is configured to couple in flow communication with a corresponding at least one second sodium line of a sodium processing circuit; wherein the filter is located to prevent the active material from leaving the cesium trap while allowing the sodium and argon to pass and the filter has a mean pore size of from 40 to 160 μm. In an example, the lower limit of the mean port size of the filter is selected from 40, 50, 60, 70, 80, and 90 μm. In another example, the upper limit of the mean pore size of the filter is selected from 100, 110, 120, 130, 140, 150, and 160 μm. In yet another example, the filter is a sintered metal filter. In still another example, the sintered metal filter is sintered from one or more of stainless steel, Hastelloy®, Monel®, Inconel®, nickel, HT-9, and titanium.

BRIEF DESCRIPTION OF THE DRAWINGS

The following drawing figures, which form a part of this application, are illustrative of described technology and are not meant to limit the scope of the technology as claimed in any manner, which scope shall be based on the claims appended hereto.

DETAILED DESCRIPTION

Figure 1:
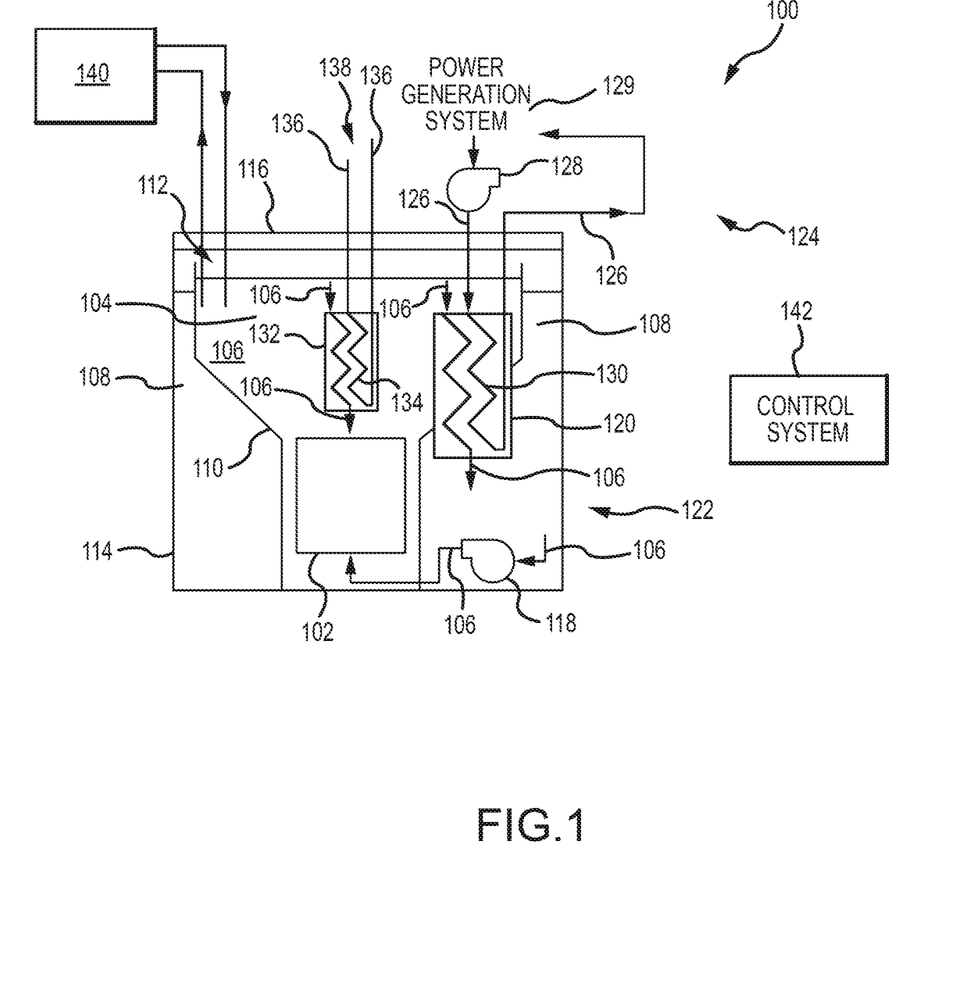
FIG. 1 illustrates, in a block diagram form, some of the basic components of a traveling wave reactor.

FIG. 1 illustrates, in a block diagram form, some of the basic components of a travelling wave reactor (TWR) 100. In general, the TWR 100 includes a reactor core 102 containing a plurality of fuel assemblies (not shown). The core 102 is disposed within a pool 104 holding a volume of liquid sodium coolant 106. The pool 104 is referred to as a hot pool and has a sodium temperature higher than that of a surrounding cold pool 108 (due to the energy generated by the fuel assemblies in the reactor core 102), which also contains liquid sodium coolant 106. The hot pool 104 is separated from the cold pool 108 by a redan 110. A headspace 112 above the level of the sodium coolant 106 is filled with an inert cover gas, such as argon. The reactor vessel 114 surrounds the reactor core 102, hot pool 104, and cold pool 108, and is sealed with a reactor head 116. The reactor head 116 provides various access points into the interior of the reactor vessel 114.

The size of the reactor core 102 is selected based on a number of factors, including the characteristics of the fuel, desired power generation, available reactor 100 space, and so on. Various embodiments of a TWR may be used in low power (around 300 MW$_e$—around 500 MW$_e$), medium power (around 500 MW$_e$—around 1000 MW$_e$), and high power (around 1000 MW$_e$ and above) applications, as required or desired. The performance of the reactor 100 may be improved by providing one or more reflectors, not shown, around the core 102 to reflect neutrons back into the core 102. Additionally, fertile and fissile nuclear assemblies are moved (or "shuffled") within and about the core 102 to control the nuclear reaction occurring therein.

The sodium coolant 106 is circulated within the vessel 114 via a primary sodium coolant pump 118. The primary coolant pump 118 draws sodium coolant 106 from the cold pool 108 and injects it into a plenum below the reactor core 102. The coolant 106 is forced upward through the core and is heated due to the reactions taking place within the reactor core 102. Heated coolant 106 enters an intermediate heat exchanger(s) 120 from the hot pool 104, and exits the intermediate heat exchanger 120 and re-enters the cold pool 108. This primary coolant loop 122 thus circulates sodium coolant 106 entirely within the reactor vessel 114.

The intermediate heat exchanger 120 incorporates a segment of a closed liquid sodium loop that is physically separated from the primary sodium pools 104 and 108 at all times (i.e., intermediate and primary sodium are never co-mingled). The intermediate heat exchanger 120 transfers heat from the primary coolant loop 122 (fully contained within the vessel 114) to an intermediate coolant loop 124 (that is only partially located within the vessel 114). The intermediate heat exchanger 120 passes through the redan 110, thus bridging the hot pool 104 and the cold pool 108 (so as to allow flow of sodium 106 in the primary coolant loop 122 therebetween). In an embodiment, four intermediate heat exchangers 120 are distributed within the vessel 114. Alternatively, two or six intermediate heat exchangers 120 are distributed within the vessel 114.

The intermediate coolant loop 124 circulates sodium coolant 126 that passes through pipes into and out of the vessel 114, via the reactor head 116. An intermediate sodium pump 128 located outside of the reactor vessel 114 circulates the sodium coolant 126, for example, through a power generation system 129. Heat is transferred from the sodium coolant 106 of the primary coolant loop 122 to the sodium coolant 126 of the intermediate coolant loop 124 in the intermediate heat exchanger 120. The sodium coolant 126 of the intermediate coolant loop 124 passes through a plurality of tubes 130 within the intermediate heat exchanger 120. These tubes 130 keep separate the sodium coolant 106 of the primary coolant loop 122 from the sodium coolant 126 of the intermediate coolant loop 124, while transferring heat energy therebetween.

A direct heat exchanger 132 extends into the hot pool 104 and provides cooling to the sodium coolant 106 within the primary coolant loop 122, usually in case of emergency. The direct heat exchanger 132 is configured to allow sodium coolant 106 to enter and exit the heat exchanger 132 from the hot pool 104. The direct heat exchanger 132 has a similar construction to the intermediate heat exchanger 120, where tubes 134 keep separate the NaK (Sodium-Potassium) of the primary coolant loop 122 from the direct heat exchanger coolant (NaK) 136 of a direct reactor coolant loop 138, while transferring heat energy therebetween.

Additionally, TWR reactor 100 includes sodium processing circuit 140 extending into the hot pool 104. The sodium processing circuit 140 facilitates channeling sodium (Na) coolant 106 therethrough for receipt, storage, purification, and/or sampling and analysis of one or more subsystems. For example, the sodium processing circuit 140 may include, but is not limited to, any number of on-site storage tanks, cold traps (e.g., devices used to remove impurities from sodium), cesium traps (e.g., devices for trapping cesium (Cs), which are discussed in further detail below), electromagnetic pumps, heat exchangers, pipelines, testing equipment, and/or control valves.

Other ancillary reactor components (both within and outside of the reactor vessel 114) include, but are not limited to, pumps, check valves, shutoff valves, flanges, drain tanks, etc., that are not depicted but would be apparent to a person of skill in the art. Additional penetrations through the reactor head 116 (e.g., a port for the primary coolant pump 118, inert cover gas and inspection ports, sodium processing, and cover gas ports, etc.) are not depicted. A control system 142 is utilized to control and monitor the various components and systems which make up the reactor 100.

Broadly speaking, this disclosure describes configurations that improve the performance of the reactor 100 described in FIG. 1. Specifically, embodiments, configurations, and arrangements of a remotely removable cesium trap assembly are shown and described in more detail below with reference to FIGS. 2-5.

In general, during operation of the reactor, radioactive cesium will enter the primary sodium coolant. To reduce the adverse radiological impact of this radionuclide, cesium traps are installed as part of the sodium processing circuit. The cesium trap assembly described below enables a cesium trap loaded with cesium to be removed from the sodium processing circuit and its shielded cell, and be replaced with another new empty cesium trap to facilitate the continued absorption and filtering of radioactive cesium from the primary sodium coolant. For example, the cesium trap assembly includes lifting eyes, lateral support anchors, sodium lines, and power and control attachments all positioned at a top portion of the cesium trap to increase remote access and ease of removal. Additionally, remotely controlled tools and lifts enable the loaded cesium trap to be removed from its shielded cell for transport to another location without direct access to the radioactive cesium. Installation of the new cesium trap may be performed with direct access to the shielded cell once the radioactive cesium is removed, thus decreasing installation time.

By enabling the cesium traps to be removable and replaceable, the loaded cesium traps are no longer stored in place at the plant and adjacent the reactor. The loaded cesium traps may be transported to an off-plant facility for storage and/or preparation for disposal. Thus, the number of shielded cells adjacent the reactor may be reduced, thus increasing plant space around the reactor. Moreover, through remote access to the loaded cesium trap and direct access to the new cesium trap, removal and replacement time may be decreased, enabling replacement of a cesium trap to be performed while the reactor continues to operate and in a short amount to time. Additionally, the highly radioactive cesium trap is replaced with reducing exposure to the personnel performing the replacement. As, such risk to plant personnel and plant operations are reduced and overall reactor efficiency and viability may be increased.

Figure 2:
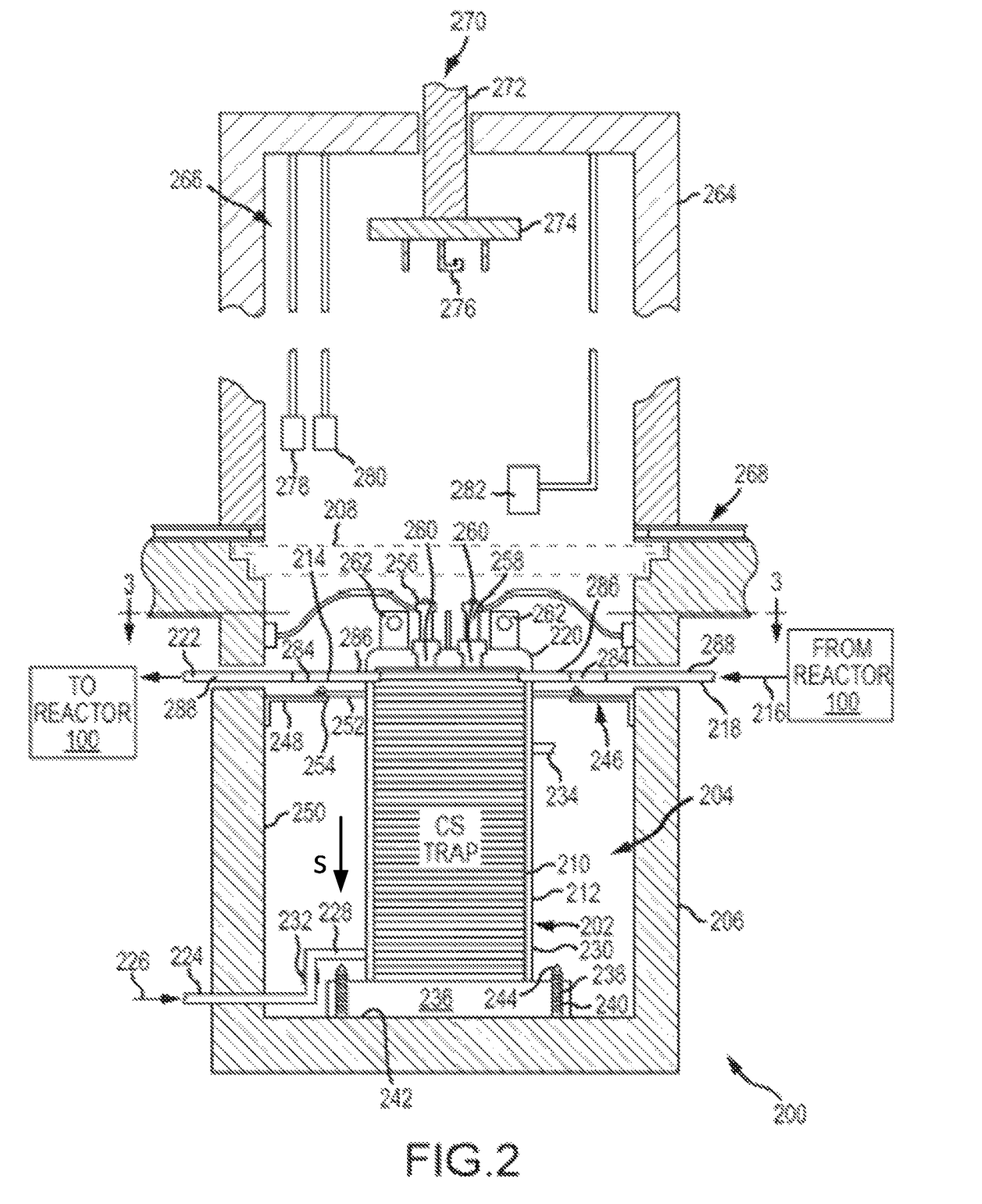
FIG. 2 is a schematic view of an example cesium trap assembly.
Figure 3:
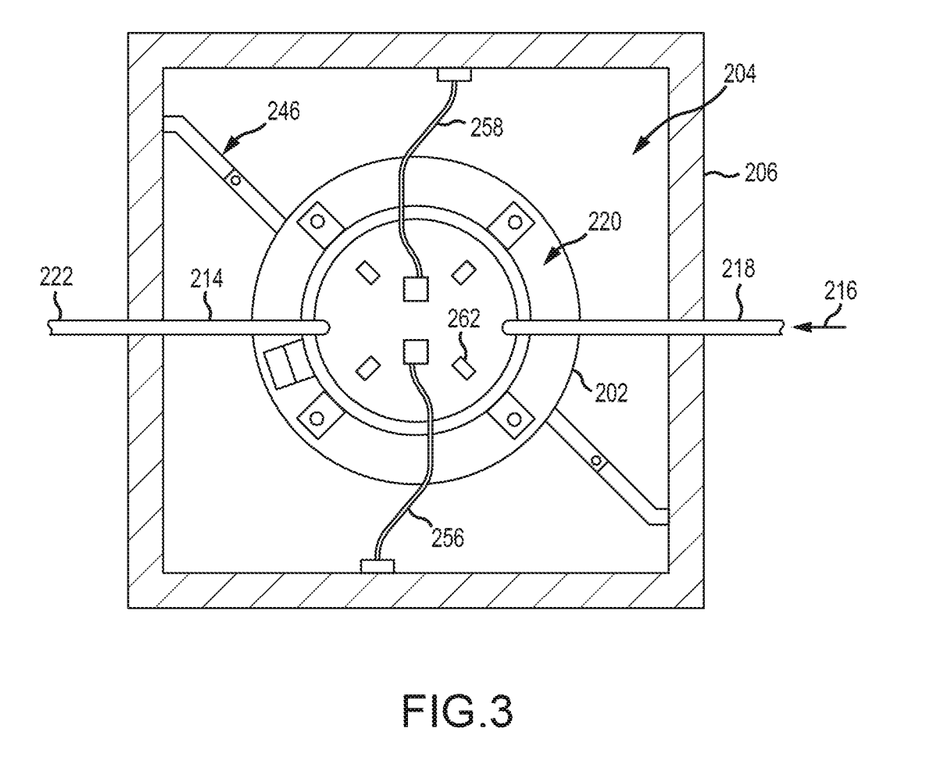
FIG. 3 is a top view of the cesium trap assembly shown in FIG. 2 taken along section line 3-3.

FIG. 2 is a schematic view of an example cesium trap assembly 200 and FIG. 3 is a top view of the cesium trap assembly 200 taken along section line 3-3. Referring to both FIGS. 2 and 3, the cesium trap assembly 200 includes a removable cesium trap 202 disposed within an interior chamber 204 of an individual shielded cell 206 that is configured to contain radioactive material therein. The cell 206 may be coverable via a removable cover 208 depicted in dashed lines in FIG. 2.

In the example, the cesium trap 202 includes a body 210 at least partially surrounded by a cooling jacket 212 as discussed in further detail below. The cesium trap 202 is coupled in flow communication with a sodium line 214 that forms at least a portion of the sodium processing circuit 140 (shown in FIG. 1), such that a stream of sodium 216 may be channeled through the body 210. Sodium stream 216 may contain, but is not limited to, sodium, cesium, and argon. For example, an inlet sodium line 218 extends from the body 210 at a top portion 220 of the cesium trap 202, and an outlet sodium line 222 also extends from the body 210 at the top portion 220. Additionally, the cesium trap 202 is coupled in flow communication with a fixed cooling line 224 such that a stream of coolant 226 may be channeled through the cooling jacket 212. An inlet cooling line 228 extends from the cooling jacket 212 proximate a bottom portion 230 of the cesium trap 202 and includes a free end 232. The free end 232 is configured to releasably couple in flow communication with the fixed cooling line 224. In one example, the free end 232 has an enlarged diameter such that the free end 232 may be slidably engaged over and around the fixed cooling line 224. In alternate examples, the inlet cooling line 228 may be releasably coupled to the fixed cooling line 224 via any other connection that enables the cesium trap 202 to function as described herein. An outlet cooling line 234 also extends from the cooling jacket 212 such that the coolant stream 226 may be exhausted into the interior chamber 204.

The cesium trap 202 is coupled to the cell 206 within the interior chamber 204. A base 236 is coupled to the bottom portion 230 and includes at least one opening 238 defined therein. The openings 238 correspond to and are configured to slidably engage with locating pins 240 extending from a floor 242 of the cell 206. The locating pins 240 include a bullet nose 244 or other tapered tip to facilitate locating of and engagement with the openings 238. Additionally, the locating pins 240 reduce excessive lower cesium trap 202 movement during seismic events. In the example, the base 236 is sized larger than the cesium trap 202 to increase stability within the cell 206. The cesium trap 202 is also coupled within the interior chamber 204 via support anchors 246 configured to support lateral and vertical loads, such as seismic loads. The lateral support anchor 246 includes a cell anchor 248 coupled to and extending from a wall 250 of cell and a trap anchor 252 coupled to and extending from cooling jacket 212. The cell anchor 248 is releasably coupled to and on top of the trap anchor 252 via a connection member 254. The connection member 254 is a captive male fastener located on the cell anchor 248 that has a bullet nose entrance to allow a remote rotational device to be used to unthread it from a corresponding female capture nut located on the trap anchor 252. In alternative examples, the connection member 254 may be a pin, a bolt, or any other connection member that enables the lateral support anchor 246 to function as described herein.

The cesium trap 202 is communicatively coupled to a control system, for example, control system 142, via electrical power attachment 256 and instrument control attachment 258 extending from cell 206. Electrical power and instrument control attachments 256 and 258 plug into the cesium trap 202 via at least one receiver 260 disposed at the top portion 220. Additionally, the cesium trap 202 includes at least one lifting eye 262, for example two or four for redundancy, extending from the top portion 220. In one example, lifting eyes 262 are welded to body 210, while in other examples lifting eyes 262 are unitarily formed with body 210. The lifting eyes 262 may be configured to facilitate rotation of the cesium trap 202 once lifted.

Positioned above the cell 206 is a moveable removal cask 264 that facilitates replacing the cesium trap 202 within cell 206. The removal cask 264 defines an interior chamber 266 that is configured to contain radioactive material therein. Additionally, a floor valve 268 is positioned above the cell 206 that may be closed after removing the cover 208. The removal cask 264 includes a remote lifting tool 270 that releasably couples to the cesium trap 202 and facilities removing the cesium trap 202 from the cell 206. For example, lifting tool 270 includes an arm 272 with a plate 274 connected thereto. The plate 274 includes at least one hook 276 extending therefrom. The hooks 276 may be substantially "J"-shaped and correspond to the lifting eyes 262 disposed on cesium trap 202. In alternative examples, lifting tool 270 has any other configuration that enables function as described herein.

Within interior chamber 266, removal cask 264 also includes a remote sodium line tool 278 that facilitates crimping and cutting the sodium line 214 as described further below, a remote anchor tool 280 that facilitates decoupling the lateral support anchors as described further below, and a remote attachment tool 282 that facilitates unplugging the electrical power and instrument control attachments 256 and 258 as described further below. In the example, each tool 270, 278, 280, and 282 are operatively coupled to a control system, for example, control system 142, for remote operation. Additionally, one or more cameras (not shown) are provided to assist remote operation. In alternative examples, removal cask 264 may include a single tool that combines all of the functions of tools 270, 278, 280, and 282 such that removal cask 264 may function as described herein.

In operation, sodium coolant 106 is circulated through reactor 100 as described above in reference to FIG. 1. As the sodium coolant 106 is channeled through the reactor core 102, fissionable fuel transfers heat to the sodium coolant 106, in addition, volatile fission products such as cesium enter the sodium coolant 106. A portion 216 of the sodium coolant 106 is channeled through sodium processing circuit 140, including the inlet and outlet sodium lines 218 and 222 and the cesium trap 202, to, in part, remove the volatile fission products contained therein and reduce any adverse radiological impact. As the sodium stream 216 is channeled through cesium trap 202, the cesium contained therein is absorbed and filtered out of the sodium stream 216 before being channeled back into the reactor 100. The operation of cesium trap 202 will be discussed in further detail below.

In some known reactors, the cesium traps are fixed within the shielded cells, and as such, once the traps are loaded with the extracted cesium, the entire cesium trap and extracted radioactive cesium are stored in place. However, long term operation of such reactors may produce a number of cesium traps loaded with radioactive cesium, with a number of radioactive shielded cells located in close proximity to the reactor core. In contrast, the above described cesium trap assembly 200 facilitates removal and replacement of the cesium traps 202 that are loaded with radioactive cesium. As such, the cesium trap 202 and radioactive cesium therein may be transferred to a more suitable long-term storage location either on-site and/or at a remote facility. Additionally, some of the reactor area surrounding the reactor core may be used for other reactor systems and processes.

Once the cesium trap 202 contains a predetermined amount of cesium, the sodium stream 216 is redirected away from the cesium trap 202 and the remaining sodium within the sodium lines 214 and the cesium trap 202 is allowed to freeze. For example, the sodium stream 216 freezes at 208° Fahrenheit, such that turning off electrical heaters of the circuit (not shown) and stopping flow of the sodium stream 216 facilitates freezing the cesium trap 202 over time. In alternative examples, cooling gas may be circulated through the cooling jacket 212 to increase freezing time. To remove the cesium trap 202 from the shielded cell 206, the floor valve 268 is installed over the cell 206 and the cover 208 removed from the cell 206 and moved to a temporary storage location on-site. The floor valve 268 is closable such that reactor personnel are shielded from the high radiation (gamma) fields from the cesium trap 202 once the cover 208 is removed. The removal cask 264 is mated to the floor valve 268 and the floor valve 268 opened to provide access into interior chamber 204 of cell 206 while maintaining containment thereof. For example, the floor valve 268, cover 208, and removal cask 264 may all be positionable via a crane (not shown) within the reactor 100 and remotely operable. In alternative examples, the floor valve 268, cover 208, and removal cask 264 are movable via any other system that enables the cesium trap 202 to be removed and replaced as described herein.

When the removal cask 264 is mated to the floor valve 268, the cesium trap 202 may be remotely decoupled from the shielded cell 206. To decouple the cesium trap 202, the sodium lines 214, the lateral support anchors 246, and the power and control attachments 256 and 258 extending to the cesium trap 202 are removed. For example, sodium line tool 278 is remotely operated to extend into interior chamber 204 and to decouple the cesium trap 202 from the sodium processing circuit 140. The sodium line tool 278 crimps both the inlet and outlet sodium lines 218 and 222 extending from the cesium trap 202 and cuts the sodium lines 218 and 222 adjacent to a crimped portion 284. As such, each sodium line 218 and 222 now includes two portions, a first portion 286 that remains extending from cesium trap 202 and a second portion 288 that remains part of the sodium processing circuit 140. Anchor tool 280 is remotely operated to extend into interior chamber 204 and decouple the lateral support anchor 246 extending between the cesium trap 202 and the cell 206. The anchor tool 280 removes connection member 254, for example, a pin or a bolt, such that trap anchor 252 is decoupled from cell anchor 248. Attachment tool 282 is remotely operated to extend into interior chamber 204 and disconnect the electrical power and instrument control attachments 256 and 258 from the cesium trap 202. The attachment tool 282 unplugs attachments 256 and 258 from the associated receivers 260. By remotely decoupling the cesium trap 202, direct access to the radioactive cell 206 is reduced. Additionally, by locating each of the sodium line 214, lateral support anchor 246, and attachments 256 and 258, proximate the top portion 220 ease of remote access increases, thus reducing replacement time.

To remove the cesium trap 202 from the shielded cell 206, the lifting tool 270 extends into interior chamber 204 and is releasably coupled to the cesium trap 202. For example, lifting tool 270 rotates and lifts hooks 276 into the corresponding lifting eyes 262 such that cesium trap 202 is movable. The lifting tool 270 vertically lifts the cesium trap 202 away from the cell 206 and into the removal cask 264 such that the base 236 slidably disengages with the locating pins 240. As the lifting tool 270 vertically lifts the cesium trap 202, the inlet cooling line 228 is also decoupled from the fixed cooling line 224 as the free end 232 automatically slidably disengages with the fixed cooling line 224. In alternative examples, the inlet cooling line 228 may be cut to decouple the cesium trap 202, similar to the procedure with the sodium lines 214. Additionally, the trap anchor 252 is positioned above the cell anchor 248 so that the cesium trap 202 may be vertically lifted. Once the cesium trap 202 is within the removal cask 264, the cesium trap 202 with cesium therein and the removal cask 264 may be moved to another location, either on-site or to a remote site, for further processing and/or long-term storage. Additionally, once the radioactive cesium is removed, the cell 206 may be directly accessed for installing a new cesium trap 202.

With the interior chamber 204 of cell 206 empty, a new replacement cesium trap, such as cesium trap 202 that is similar to the cesium trap removed but without any cesium therein, may be inserted into the shielded cell 206 using typical personnel and rigging methods on the overhead crane. The replacement cesium trap 202 is releasably coupled to a lifting tool, for example, the lifting tool 270 via corresponding hooks 276 and lifting eyes 262 such that the replacement cesium trap 202 may be placed into the interior chamber 204 of the cell 206. In alternative examples, the replacement cesium trap 202 is coupled to a different lifting tool, such as the crane within the reactor 100. As the replacement cesium trap 202 is lowered into the cell 206, the base 236 is simultaneously aligned with the locating pins 240 to position the replacement cesium trap 202 along the floor 242. By aligning the locating pins 240, the free end 232 of the inlet cooling line 228 is automatically slidably engaged with the fixed cooling line 224.

Once the replacement cesium trap 202 is placed within the cell 206, the replacement cesium trap 202 is attached to the shielded cell 206. This attachment may be performed with direct access to the cell because no radioactive cesium is present therein. To attach the replacement cesium trap 202, the sodium lines 214, the lateral support anchors 246, and the power and control attachments 256 and 258 are extended to the cesium trap 202. For example, the replacement cesium trap 202 is coupled to the sodium processing circuit 140. The first portion 286 of the sodium line 214 extending from the cesium trap 202 is aligned and welded to the second portion 288 of the sodium line extending from the sodium processing circuit, thus forming the inlet and outlet sodium lines 218 and 222. The cell anchor 248 is coupled to the trap anchor 252 via a connection member 254, such as a pin or a bolt, forming the lateral support anchor 246. The electrical power and instrument control attachments 256 and 258 are connected, via plugging, to corresponding receivers 260. Once the replacement cesium trap 202 is attached to the shielded cell 206, the sodium processing circuit 140, and other piping and electrical connections, the cover 208 is replaced, and the replacement cesium trap 202 may begin to receive the sodium stream 216 and facilitate filtering and extracting cesium out of the sodium stream 216 as discussed further below.

Figure 4:
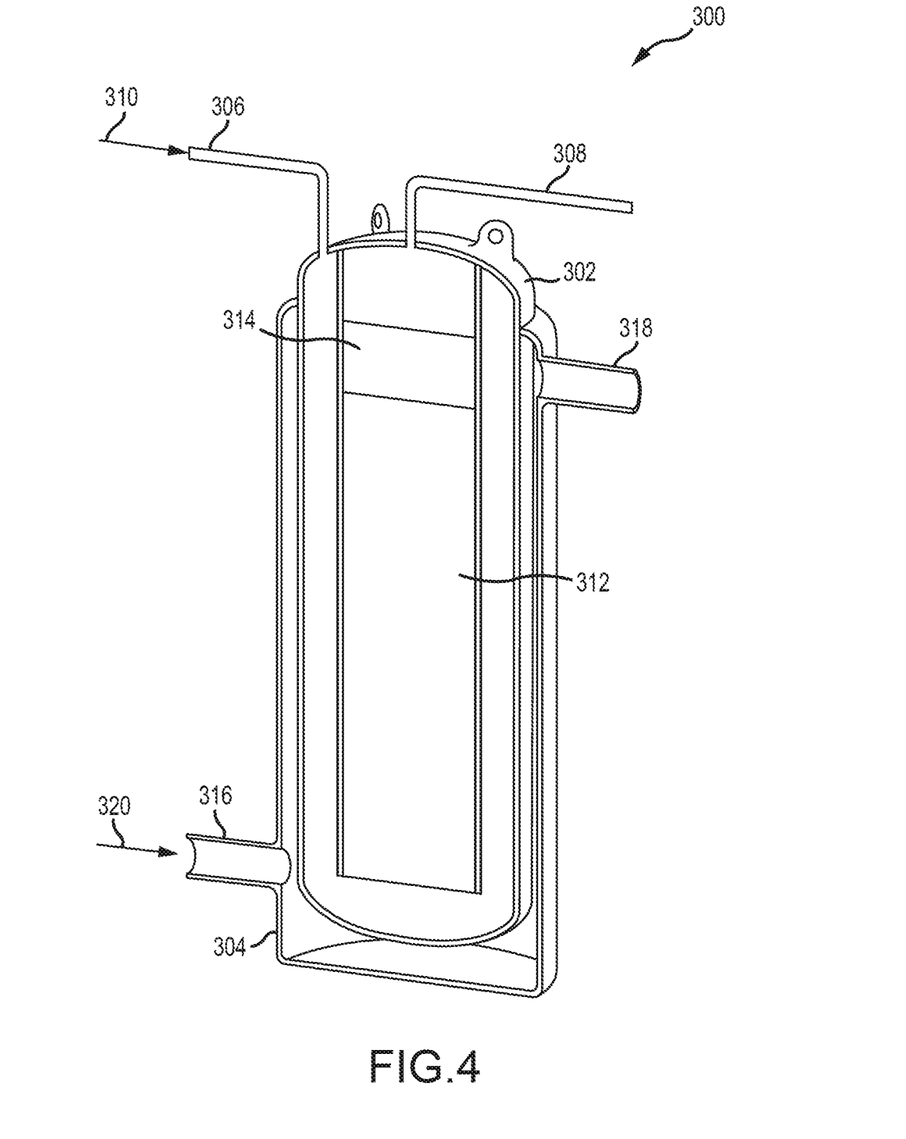
FIG. 4 is a perspective view of an example cesium trap.

FIG. 4 is a perspective view of an example cesium trap 300 that includes a body 302 at least partially surrounded by a cooling jacket 304, similar to the cesium trap described above. The body 302 includes an inlet line 306 and an outlet line 308 such that a stream of sodium 310 is channeled therethrough. Within body 302, the cesium trap 300 includes a column of active material 312. For example, the active material is Reticulated Vitreous Carbon (RVC) that adsorbs cesium and removes the cesium from the sodium stream 310. Body 302 also includes a filter 314 that filters RVC particles that may become entrained within the sodium stream 310. Additionally, the cooling jacket 304 includes an inlet line 316 and an outlet line 318 such that a stream of coolant 320 is channeled therethrough. For example, the coolant 320 is nitrogen that reduces the operating temperature of the cesium trap 300.

In alternative examples, the inlet line 306 and/or the outlet line 308 may extend into the cesium trap 300 such that the level of sodium therein to be lowered in preparation for disposal. In further alternative examples, the cesium trap 300 may include a capped line (not shown) that facilitates draining the sodium therein in a purpose built hot cell preparation facility and inserting material to reduce the chemical reactivity of sodium, such as lead, in preparation for disposal.

In an example of the cesium trap 300, the filter 314 that prevents RVC from exiting the trap has a mean pore size of from 40 to 160 μm. In particular, a filter 314 having a mean pore size from a lower limit of any of 40, 50, 60, 70, 80, or even 90 μm to an upper limit of any of 100, 110, 120, 130, 140, 150 or even 160 μm are contemplated. Through testing, the above ranges of mean pore size where determined to be more effective in maintaining adequate filtration and throughput of the anticipated sodium and entrained argon stream to be passed through the cesium trap 300. Mean pore sizes of 25 or less for the filter 314 have been determined to have reduced throughput when there is significant amounts of argon entrained in the sodium to be passed through the cesium trap 300. This limits the power output of the reactor 100. The filter 314 may be any appropriate filter media. In an example, the filter 314 is a sintered metal filter. The sintered metal filter may be made of one or more of stainless steel, Hastelloy®, Monel®, Inconel®, nickel, HT-9, and titanium to name but a few possible metals. Alternatively, other filter types and filter media may be used having the mean pore size as described above.

Figure 5:
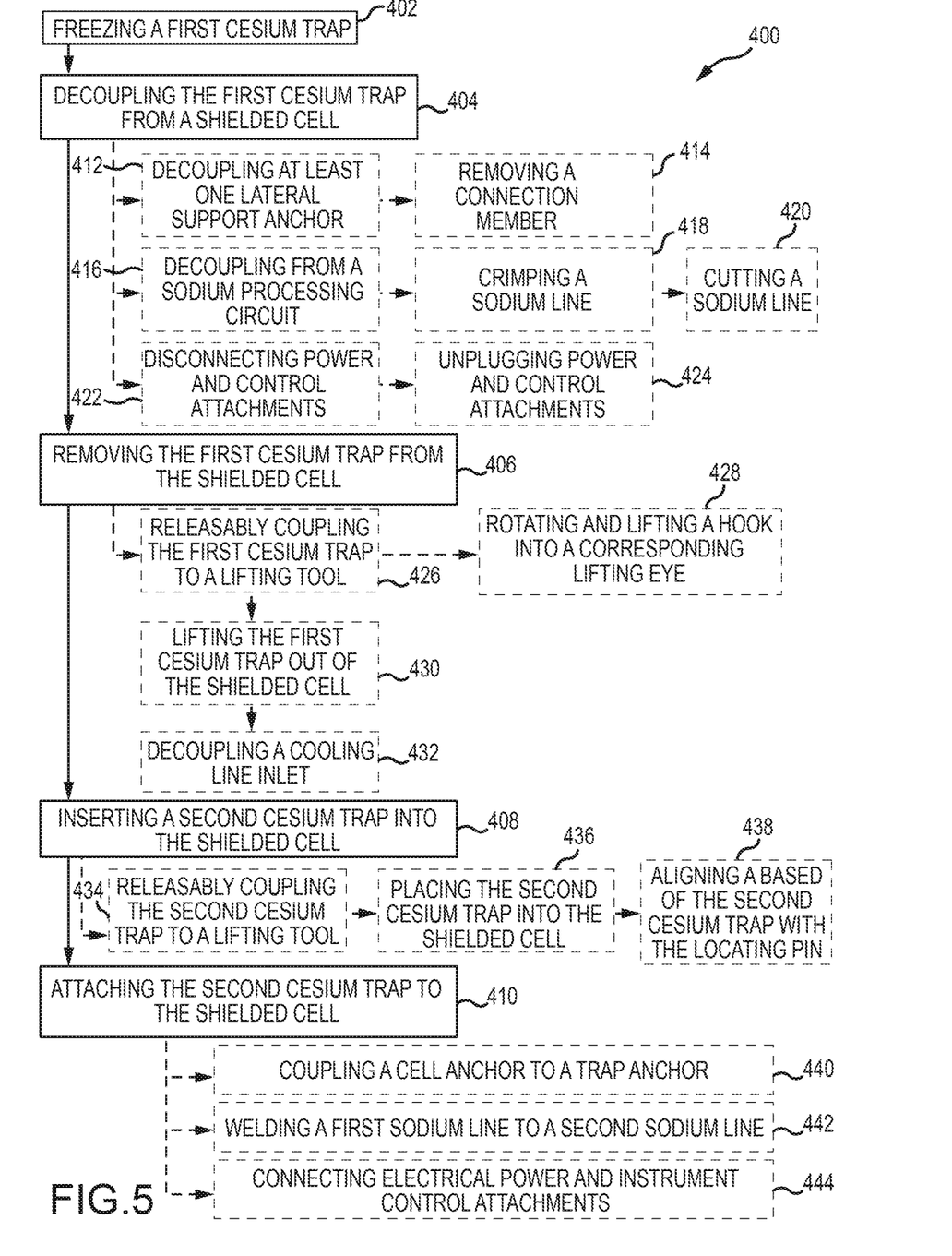
FIG. 5 is a flowchart illustrating a method of replacing a cesium trap.

FIG. 5 is a flowchart illustrating a method 400 of replacing a cesium trap. The method 400 includes a first cesium trap at least partially containing cesium therein being frozen 402. The first cesium trap is decoupled 404 from a shielded cell and then removed 406 from the shielded cell. A second cesium trap is inserted 408 into the shielded cell and then attached 410 to the shielded cell.

Decoupling 404 the first cesium trap includes removing lateral support anchors, sodium lines, and power and electrical connections extending thereto. For example, the first cesium trap may be remotely decoupled 412 from a lateral support anchor. As such, a connection member may be removed 414 between a cell anchor and a trap anchor. The first cesium trap may be remotely decoupled 416 from a sodium processing circuit. As such, a sodium line is crimped 418 and cut 420. The first cesium trap may be also remotely disconnected 422 from electrical power and instrument control attachments. As such, the electrical power and instrument control attachments are unplugged 424 from a corresponding receiver.

Removing 406 the first cesium trap includes releasably coupling 426 the first cesium trap to a lifting tool. For example, the lifting tool may include a hook that is rotated and lifted 428 into a corresponding lifting eye of the cesium trap. The first cesium trap is then lifted 430 by the lifting tool out of the shielded shell. The lifting operation may also simultaneously decouple 432 a cooling line inlet from a fixed cooling line.

Inserting 408 the second cesium trap includes coupling 434 the second cesium trap to a lifting tool, for example, via a hook extending from the lifting tool and a corresponding lifting eye of the cesium trap. The second cesium trap is then placed 436 into the shielded cell by the lifting tool, and simultaneously a base of the second cesium trap is aligned 438 with at least one locating pin extending from the floor of the shielded cell.

Attaching 410 the second cesium trap includes re-coupling lateral support anchors, sodium lines, and power and electrical connections thereto. For example, a cell anchor may be coupled 440 to a trap anchor forming a lateral support anchor within the cell. A first sodium line of the second cesium trap may be welded 442 to a second sodium line of the sodium processing circuit forming the sodium lines of the second cesium trap. Additionally, the electrical power and instrument control attachments may be connected 444 into a corresponding receiver.

What is claimed is:

1. A cesium trap comprising:
a body comprising a top portion, the body enclosing a filter and an active material configured to remove cesium from a sodium stream;
a cooling jacket disposed around the body;
at least one trap anchor extending from the cooling jacket, wherein the trap anchor is releasably couplable to at least one corresponding cell anchor extending from a shielded cell in which the body is disposed so as to form at least one lateral support anchor;
at least one first sodium line extending from the top portion, wherein the at least one first sodium line is configured to couple in flow communication with a corresponding at least one second sodium line of a sodium processing circuit; and
a base coupled to a bottom portion of the body, wherein at least one opening is defined within the base such that the base is positionable within a bottom of the shielded cell via at least one corresponding locating pin.

2. The cesium trap of claim 1 further comprising at least one lifting eye disposed on the top portion, the at least one lifting eye configured to receive a lifting tool for placing the cesium trap into and removing the cesium trap from the shielded cell.

3. The cesium trap of claim 1 further comprising an inlet cooling line extending from a bottom portion of the cooling jacket, wherein the inlet cooling line has a free end that is releasably couplable in flow communication to a corresponding fixed cooling line within the shielded cell.

4. The cesium trap of claim 1 further comprising at least one receiver disposed on the top portion, wherein the at least one receiver is configured to releasably receive a plurality of electrical power and instrument control attachments.

5. A cesium trap comprising:
a body comprising a top portion, the body enclosing a filter and an active material configured to remove cesium from a sodium stream containing cesium and argon;
at least one trap anchor extending from the body, wherein the trap anchor is releasably couplable to at least one corresponding cell anchor extending from a shielded cell in which the body is disposed so as to form at least one lateral support anchor;
a base coupled to a bottom portion of the body, wherein at least one opening is defined within the base such that the base is positionable within a bottom of the shielded cell via at least one corresponding locating pin; and
at least one first sodium line extending from the top portion, wherein the at least one first sodium line is configured to couple in flow communication with a corresponding at least one second sodium line of a sodium processing circuit;
wherein the filter is located to prevent the active material from leaving the cesium trap while allowing the sodium and argon to pass and the filter has a mean pore size of from 40 to 160 µm.

6. The cesium trap of claim 5 wherein the lower limit of the mean pore size of the filter is selected from 40, 50, 60, 70, 80, and 90 µm.

7. The cesium trap of claim 5 wherein the upper limit of the mean pore size of the filter is selected from 100, 110, 120, 130, 140, 150, and 160 µm.

8. The cesium trap of claim 5, wherein the filter is a sintered metal filter.

9. The cesium trap of claim 8 wherein the sintered metal filter is sintered from one or more of stainless steel, nickel, HT-9, and titanium.

* * * * *